United States Patent
Moore et al.

(10) Patent No.: US 12,330,714 B2
(45) Date of Patent: Jun. 17, 2025

(54) TRAILER HAVING UTILITY LINE RACEWAY

(71) Applicant: STI Holdings, Inc., Stoughton, WI (US)

(72) Inventors: Steven Paul Moore, Oregon, WI (US); Gregory Michael Dybevik, Edgerton, WI (US); Taylor John Nathan Tachon, Brooklyn, WI (US)

(73) Assignee: STI Holdings, Inc., Stoughton, WI (US)

( * ) Notice: Subject to any disclaimer, the term of this patent is extended or adjusted under 35 U.S.C. 154(b) by 863 days.

(21) Appl. No.: 17/542,885

(22) Filed: Dec. 6, 2021

(65) Prior Publication Data

US 2023/0174168 A1 Jun. 8, 2023

(51) Int. Cl.
| | |
|---|---|
| *B62D 33/04* | (2006.01) |
| *B62D 53/06* | (2006.01) |
| *B62D 53/08* | (2006.01) |
| *B62D 53/12* | (2006.01) |

(52) U.S. Cl.
CPC .......... *B62D 33/046* (2013.01); *B62D 53/06* (2013.01); *B62D 53/0857* (2013.01); *B62D 53/125* (2013.01); *B62D 53/0842* (2013.01)

(58) Field of Classification Search
None
See application file for complete search history.

(56) References Cited

U.S. PATENT DOCUMENTS

| | | | | | |
|---|---|---|---|---|---|
| 2,616,945 | A | * | 11/1952 | White | B60D 1/62 |
| | | | | | 174/507 |
| 3,210,116 | A | * | 10/1965 | Chieger | B60D 1/62 |
| | | | | | 280/422 |
| 3,243,201 | A | * | 3/1966 | Bock | B62D 21/17 |
| | | | | | 280/421 |
| 4,366,965 | A | * | 1/1983 | Rhodes | H01R 13/60 |
| | | | | | 280/421 |
| RE31,359 | E | | 8/1983 | Nickola | |

(Continued)

OTHER PUBLICATIONS

Strick Trailers, "Custom Trailer Options," <https://www.stricktrailers.com/products/custom-options/> web page visited Aug. 20, 2021.

(Continued)

*Primary Examiner* — Jacob D Knutson
(74) *Attorney, Agent, or Firm* — Michael Best & Friedrich LLP

(57) ABSTRACT

A cargo trailer includes a plurality of walls defining a cargo area, the walls including a front wall facing a rear of a tractor when the cargo trailer is coupled to the tractor. A recessed cavity is provided at a forward side of the front wall. A plurality of utility line connectors are positioned at least partially within the recessed cavity for establishing connections between at least one utility source of the tractor and at least one utility component of the cargo trailer. The plurality of utility line connectors are spaced vertically above a bottom wall of the recessed cavity. A raceway has an upper end situated on the bottom wall and a lower end situated at a height below the cargo area. The raceway defines an interior tunnel receiving a plurality of utility lines connected to the plurality of utility line connectors, the interior tunnel sealed from cargo area.

21 Claims, 10 Drawing Sheets

(56) References Cited

U.S. PATENT DOCUMENTS

| | | | | |
|---|---|---|---|---|
| 4,624,472 | A | * | 11/1986 | Stuart .................... B60D 1/62 |
| | | | | 439/701 |
| 5,664,826 | A | * | 9/1997 | Wilkens ................ B62D 33/04 |
| | | | | 52/270 |
| 6,444,906 | B1 | | 9/2002 | Lewis |
| 6,558,167 | B2 | | 5/2003 | Harmon et al. |
| 6,633,479 | B2 | | 10/2003 | Benson |
| 7,643,271 | B2 | | 1/2010 | Phillips et al. |
| 9,045,093 | B2 | | 6/2015 | Dobrow et al. |
| 9,815,501 | B2 | | 11/2017 | McCormack et al. |
| 10,458,627 | B2 | | 10/2019 | Perez-Bolivar et al. |
| 10,688,839 | B1 | | 6/2020 | Slade et al. |

OTHER PUBLICATIONS

Trudell Trailers, "Air & Electrical Connections," <https://www.trudelltrailers.com/trailer-sales/new/refrigerated/everest-tl/_detail.php?gid=E7> web page visited Aug. 20, 2021.

Great Dane, "CHAMPION Dry Freight Vans," brocure obtained online from <https://www.trudelltrailers.com/trailer-sales/new/> © 2017 (8 pages).

IAA, "2020 Great Dane Trailers," <https://www.iaai.com/vehicledetails/40836803?tenant=US&RowNumber=31> web page visited Aug. 27, 2021.

Stoughton Trailers, images illustrating a recessed nosebox construction, publicly available at least as early as 1992 (2 pages).

* cited by examiner

US 12,330,714 B2

TRAILER HAVING UTILITY LINE RACEWAY

BACKGROUND

The invention relates to over-the-road trailers and structures therein provided for utility line connections between the trailer front wall and a tractor connected with and configured to pull the trailer. A conventional tractor-trailer combination is shown in FIG. 1 and includes a tractor 1020 having a power plant and a chassis, and a trailer 1024 releasably coupled to the tractor 1020 and configured to be towed by the tractor 1020. The trailer 1024 has a front end 1028 adapted to face the rear of the tractor 1020 when coupled for transport. Because the trailer 1024 is not permanently linked with the tractor 1020 and does not have its own on-board utilities, a plurality of utility lines 1032 extend from the rear of the tractor 1020 for connection with a plurality of connectors provided at the front end 1028 of the trailer 1024. The utility lines 1032 make it possible to send power and communicate control signals from the tractor 1020 to the trailer 1024 for the proper functioning of the tractor/trailer combination. The utility lines 1032 can include both electrical and air lines, and the connections can optionally be made at a recessed cavity 1036 or "nosebox" in the front wall 1040 of the trailer 1024 as shown in FIG. 2. From the recessed cavity 1036, additional utility lines 1078, 1088 are provided to enable air or electrical communication to an interior side of the front wall 1040 and subsequently to an underside of the trailer 1024 for further routing (e.g., to lights, service brakes, parking brakes, etc.). To avoid routing the additional utility lines 1078, 1088 from the recessed cavity 1036 along the forward side of the front wall 1040, a plurality of individual water-tight connectors 1044 can be provided at the bottom of the recessed cavity 1036. Each one of the utility lines 1078, 1088 necessitates an individual connector 1044. Individualization is required to ensure that the lines 1078, 1088 do not create water leak paths into the trailer wall interior. Such arrangements are known in a variety of trailers, including the conventional dry van illustrated, which includes multiple wheeled axles at a rear portion thereof, and a fifth-wheel coupler adjacent the front end 1028.

SUMMARY

In one aspect, the invention provides a cargo trailer including a plurality of walls defining a cargo area. The plurality of walls include a front wall configured to face a rear of a tractor when the cargo trailer is coupled to the tractor. A recessed cavity is provided at a forward side of the front wall. A plurality of utility line connectors are positioned at least partially within the recessed cavity for establishing connections between at least one utility source of the tractor and at least one utility component of the cargo trailer. The plurality of utility line connectors are spaced vertically above a bottom wall of the recessed cavity. A raceway is provided and has an upper end situated on the bottom wall and a lower end situated at a height below the cargo area. The raceway defines an interior tunnel configured for receiving a plurality of utility lines connected to the plurality of utility line connectors, and the interior tunnel is sealed from cargo area.

In another aspect, the invention provides a cargo trailer including a rear end configured for loading and unloading cargo, and a coupler including a kingpin adjacent a front end of the cargo trailer and configured for facilitating attachment with a tractor. A cargo area is defined between the front and rear ends. A recessed cavity is provided at a forward-facing side of a front wall of the cargo trailer at the front end thereof. A plurality of utility line connectors are positioned within the recessed cavity and configured for connection with a plurality of external utility lines. The raceway defines a sealed tunnel extending between the recessed cavity and the coupler, the sealed tunnel jointly accommodating a plurality of trailer utility lines that are connected with the plurality of utility line connectors in the recessed cavity.

DETAILED DESCRIPTION

Figure 3:
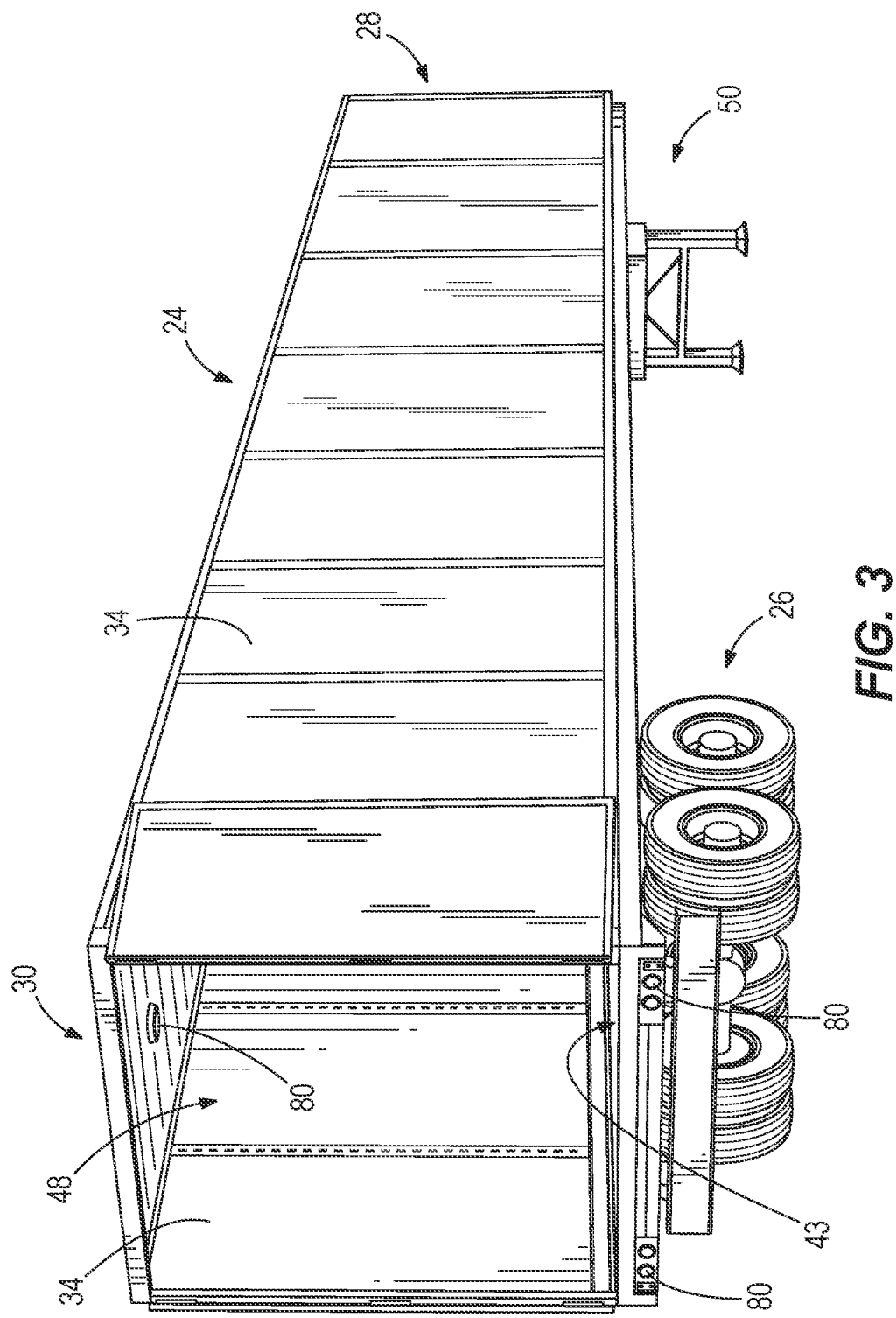
FIG. 3 is a perspective view of a trailer according to one embodiment of the present disclosure.

FIGS. 3-10 illustrate a trailer 24 according to one exemplary embodiment of the present disclosure. The trailer 24, which is shown as a semi-trailer configured for over-the-road use with a road tractor (e.g., like that of FIG. 1 in forming a so-called 18-wheeler) to transport large amounts of cargo. Aspects of the invention may not be limited to such types of trailers however, and it will be understood that features described herein may also apply to alternate types of trailers. As shown in FIG. 3, the trailer 24 can include a chassis having axles with multiple sets of wheels 26 toward the rear end 30. The trailer 24 defines a length in a longitudinal or transport direction between its front and rear ends 28, 30. The length of the trailer 24 can be 53 feet in some constructions, although the trailer 24 can be manufactured to other lengths greater than or less than 53 feet. Perpendicular to the longitudinal direction, the trailer 24 defines a width and a height. The width cooperates with the length to define a plan view footprint of the trailer 24, while the height is measured perpendicular to the footprint (which can be perpendicular to the ground). The illustrated trailer 24 includes a pair of sidewalls 34, a front wall 40 (FIG. 4), a roof 42, and a load floor 43. A cargo area 46 operable to receive a load of cargo for transport is defined by the sidewalls 34, the front wall 40, the roof 42, and the load floor 43 of the trailer 24. Subtracting for wall thicknesses, the length, the width, and the height cooperate to define the interior cargo volume of the trailer 24. At the rear end 30 of the trailer 24 as shown in FIG. 3, an opening for selectively accessing the cargo area 46 is closed by one or more doors 48. Adjacent the front end 28, the trailer 24 includes landing gear 50 configured to support the front end 28 on a ground surface when the trailer 24 is not coupled to a tractor for transport.

Figure 4:
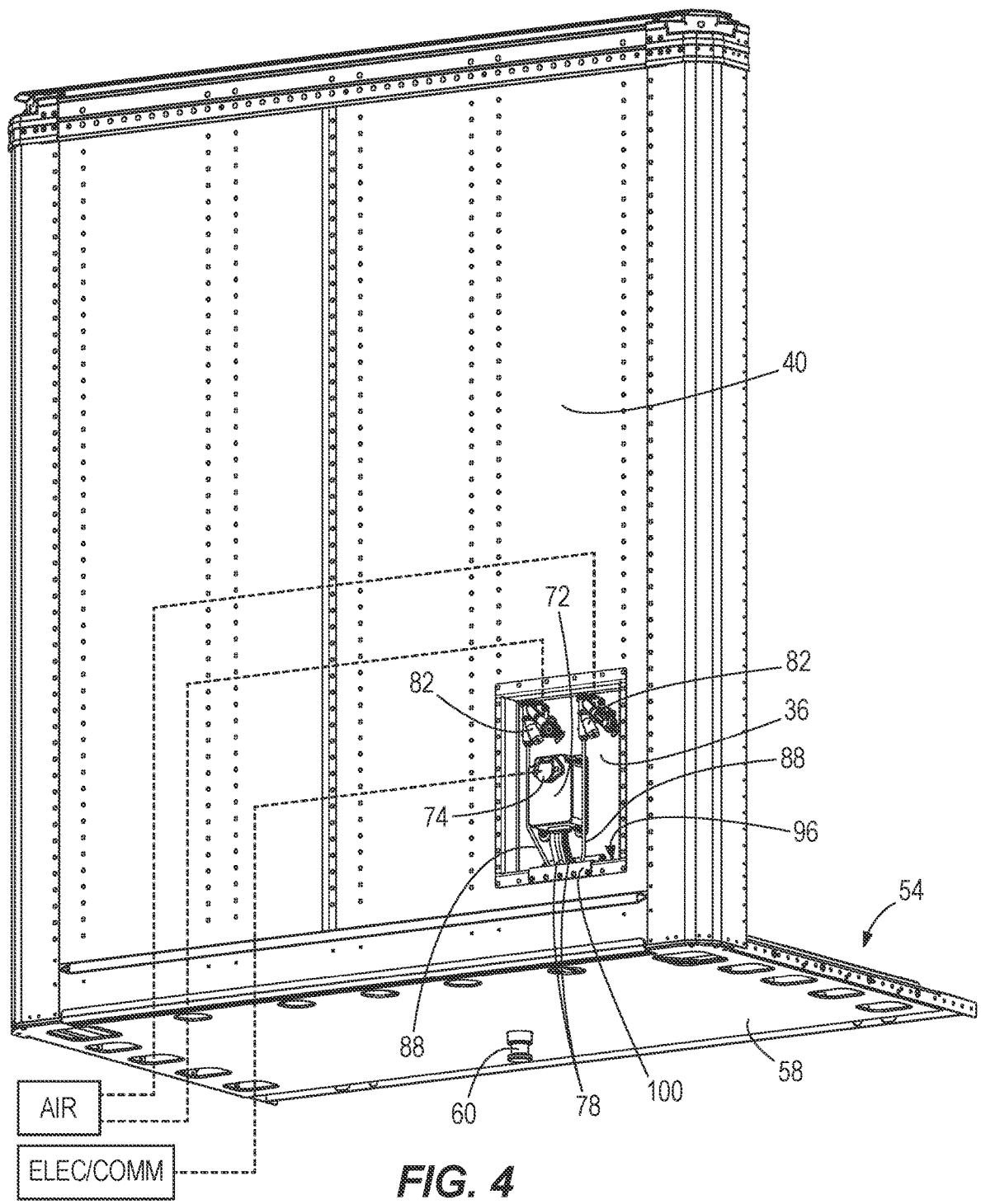
FIG. 4 is a bottom perspective view of a front wall and a coupler of the trailer of FIG. 3.
Figure 6:
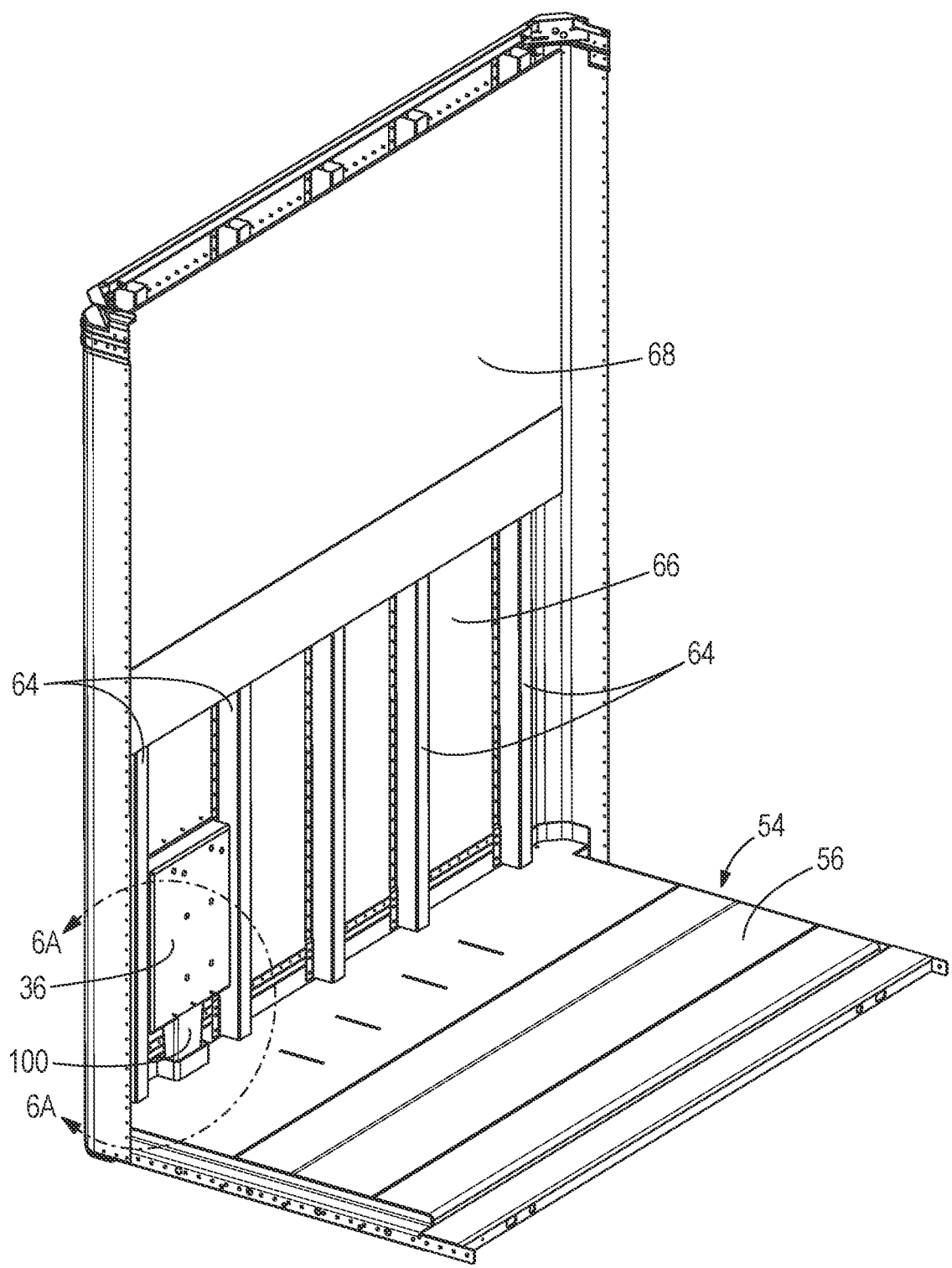
FIG. 6 is an interior perspective view of the front wall and the coupler of the trailer of FIG. 3, including a utility line raceway extending from a recessed nosebox. A lower portion of an interior liner is removed to show the front wall interior.

As shown in FIG. 4, the trailer 24 is provided, at the front end 28 and under the load floor 43, with a coupler 54. The coupler 54 includes upper and lower plates 56, 58 and a kingpin 60 extending downward below the lower plate 58. The kingpin 60 can be used in establishing the "fifth-wheel" coupling known in the art. Also shown in FIG. 4 is a recessed cavity 36 or "nosebox" for accommodating a group of utility connectors in accordance with the description below. The recessed cavity 36 is positioned at and recessed from a forward side of the trailer front wall 40. The recessed cavity 36 can be formed as a prismatic open-sided box situated to occupy the space between two adjacent wall posts 64 (FIG. 6) of the front wall 40. The box can be of sheet metal or composite construction. Also shown in FIG. 6, the front wall 40 can include an exterior skin 66 extending along an exterior side of the wall posts 64 and an interior skin or cargo area liner 68 extending along an interior side of the wall posts 64. Both of the exterior skin 66 and the interior cargo area liner 68 can be secured to the wall posts 64, for example fastened with mechanical fasteners and/or bonded with adhesive. A lower portion of the cargo area liner 68 is removed from FIG. 6 for the purpose of illustrating the interior construction of the front wall 40. As shown in FIG. 6, a front end of the coupler 54 can extend to meet the lower ends of the front wall posts 64.

Figure 1:
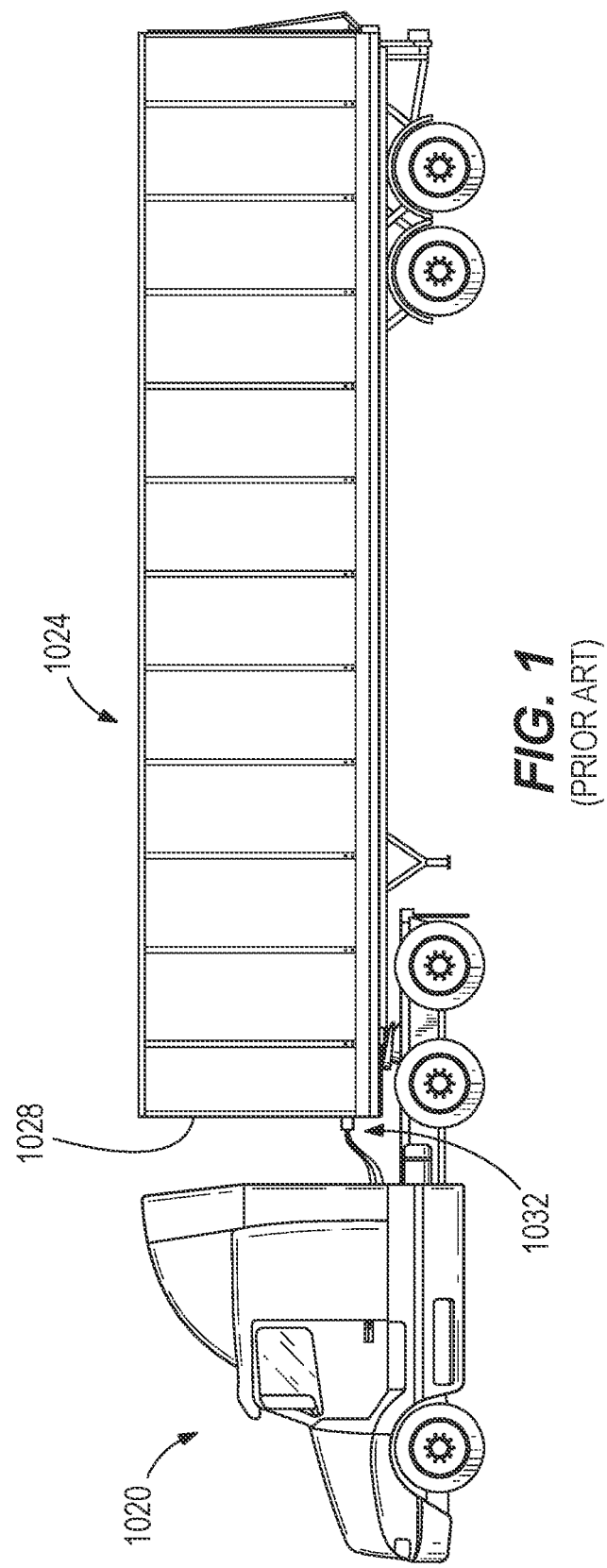
FIG. 1 is a side elevation view of a tractor-trailer combination, according to the prior art.
Figure 2:
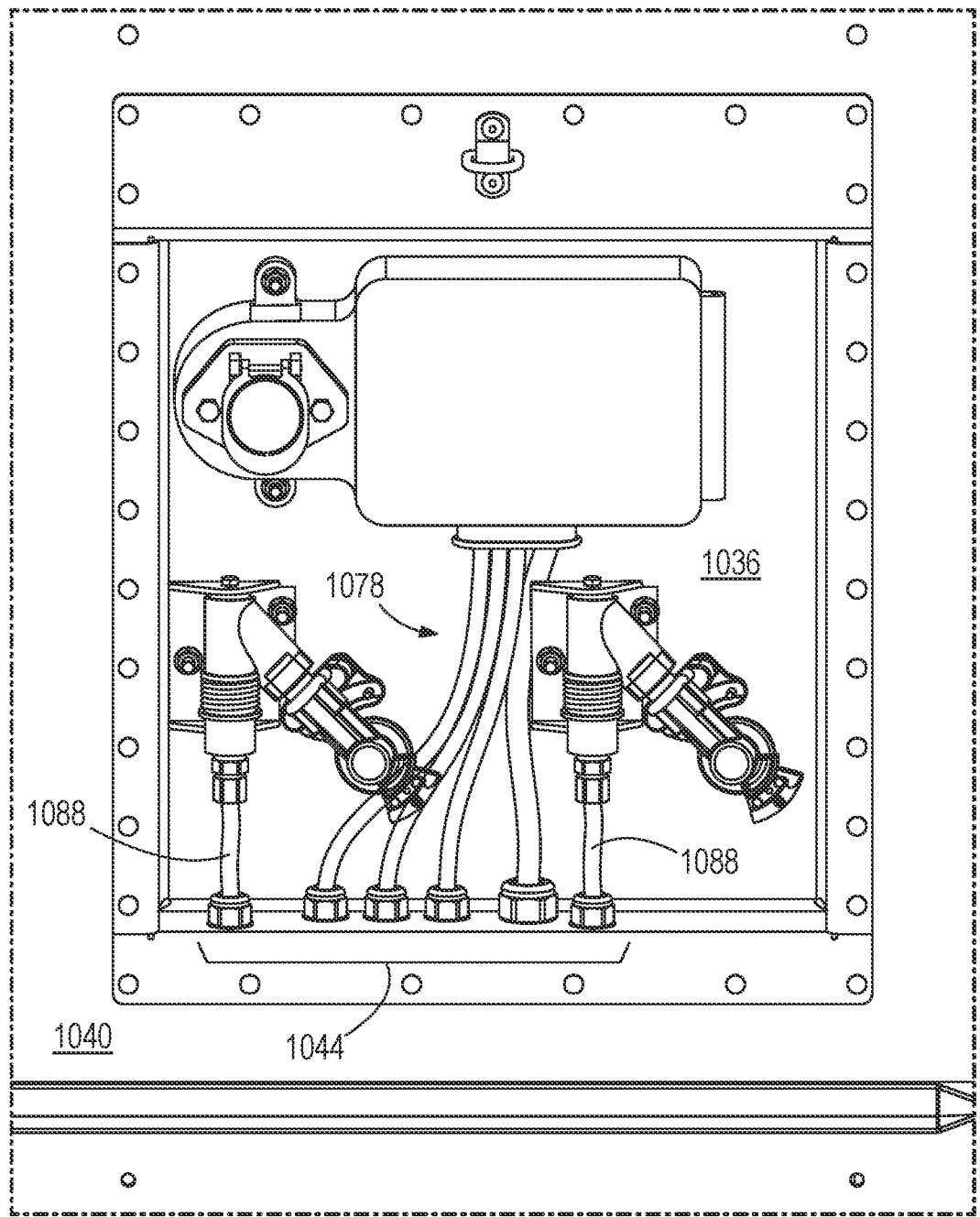
FIG. 2 is a perspective view of a recessed nosebox including a plurality of utility line connectors at a front end of the trailer of FIG. 1.
Figure 5:
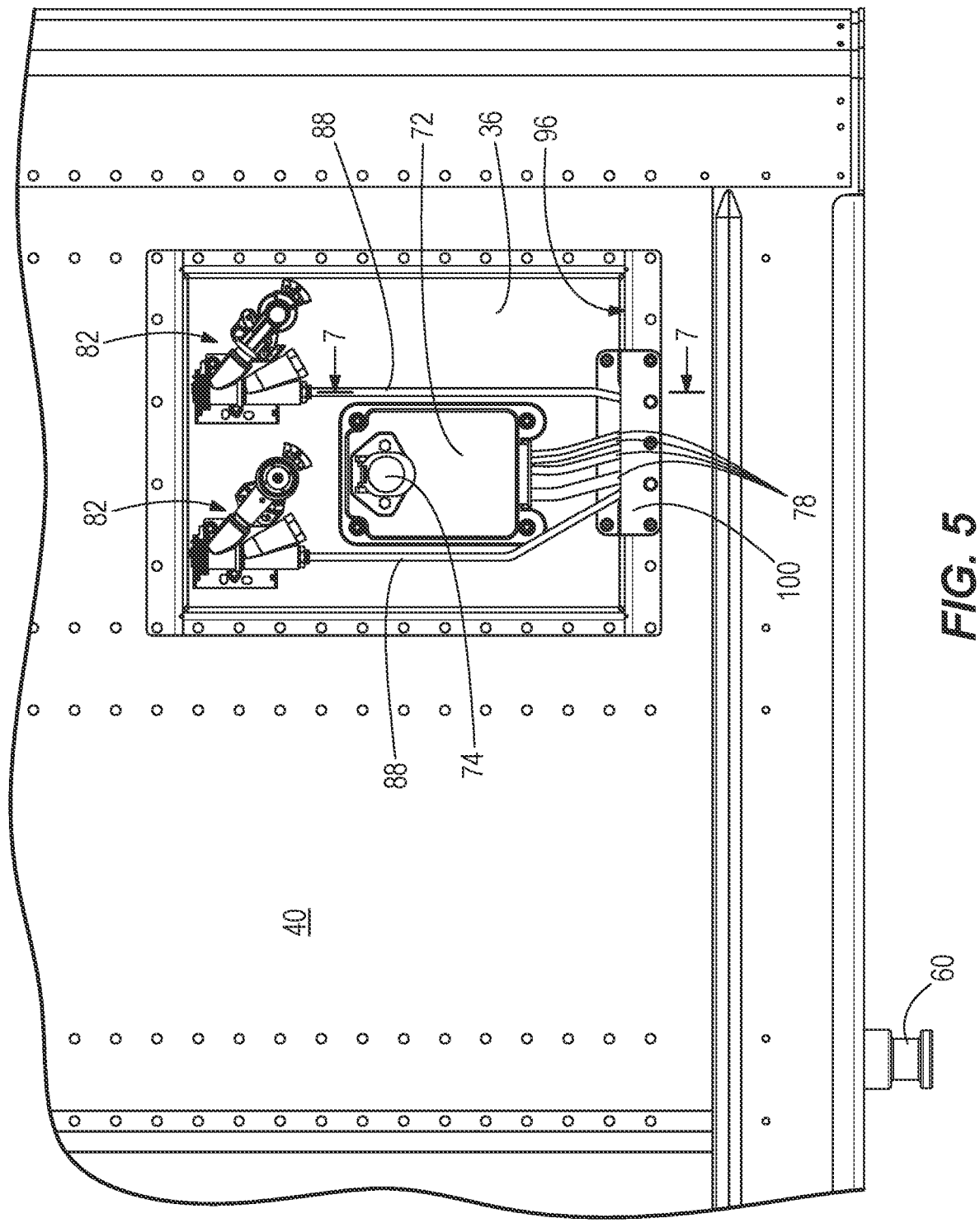
FIG. 5 is a partial front view of the trailer of FIG. 3.

Turning primarily to FIGS. 4 and 5, the recessed cavity 36 partially or entirely accommodates a plurality of utility line connectors for establishing utility line connections (e.g., air and/or electrical) with utility lines (not shown) extending from the rear of a tractor (see FIG. 1). The utility line connectors in the recessed cavity 36 can include an electrical connector 72. In some constructions, the electrical connector 72 can include an input socket 74 such as a standardized (e.g., SAE, ISO) 7-way socket. The input socket 74 can be forward-facing as shown and configured to accept a standardized electrical plug of an electrical cord (e.g., 7-wire cable) extending from a tractor, for example, from an electronic power supply and/or communications module (shown schematically in FIG. 4 as "ELEC/COMM") provided at the tractor. In some constructions, the 7-wire cable from the tractor may conform to SAE-J1067 and the associated 7-pin connectors (i.e., one on the cable and one at the input socket 74) may conform to SAE-J560b. Additional electrical lines 78 extend from an output side of the electrical connector 72 and into the trailer 24 for connection with a plurality of electrical devices (e.g., lamps, sensors, and/or actuators) of the trailer 24. The devices and the electrical lines 78 constitute an electrical system of the trailer 24. The electrical lines 78 can be connected with various types of lamps 80, including any or all of taillights, brake lights, marker or clearance lights, and interior dome lights.

Furthermore, the utility line connectors in the recessed cavity 36 can include first and second air connectors or "gladhands" 82. In some constructions, each gladhand connector 82 can include an input side 84 configured to accept a standardized mating gladhand connector of an air line extending from a tractor, e.g., from an air source or compressor (shown schematically in FIG. 4 as "AIR") provided at the tractor. An additional air line 88 extends from an output side of each one of the gladhand connectors 82 and into the trailer 24 for connection with a plurality of pneumatic devices (e.g., service brakes and/or parking brake, suspension air bags) of the trailer 24. The recessed cavity 36 thus prevents the need to routing the utility lines 78, 88 along the forward side of the trailer front wall 40. In particular, all the utility lines 78, 88 extending from the outlet- or trailer-side of the connectors 72, 82 extend through a bottom wall 96 of the recessed cavity 36. As described in further detail below, this is accomplished by provision of a single utility line raceway 100 establishing a common pass-through 110 for all the utility lines 78, 88. The utility lines 78, 88 extend between the exterior skin 66 and the interior cargo area liner 68 of the front wall 40, and extend from there further to an underside of the trailer 24 for routing to the electrical and pneumatic components.

The utility line raceway 100 (simply "raceway 100" hereinafter) features a first or upper end 104 and a second or lower end 106 opposite the upper end 104 (FIGS. 7-10). Each of the ends 104, 106 is an open end and defines an opening configured for passage of all the utility lines 78, 88 on the trailer-side of the connectors 72, 82 in the recessed cavity 36. Between the ends 104, 106, the raceway 100 includes a wall 108 that defines a body of the raceway 100 between its open ends 104, 106. The wall 108 can be a solid, continuous wall that is encircling so as to form a tunnel or pass-through 110 for all the utility lines 78, 88. As shown in at least FIGS. 5 and 7, the opening at the upper end 104 of the raceway 100 is open to the recessed cavity 36 and is situated at the bottom wall 96 thereof. The raceway body wall 108 extends downward to the coupler 54 such that the lower end 106 of the raceway is positioned at a height below the cargo area 46. In particular, the opening at the lower end 106 of the raceway 100 is open to a space between the upper and lower coupler plates 56, 58. As described in further detail below, the raceway 100 is sealed to the upper coupler plate 56. Likewise, the raceway 100 is sealed to the bottom wall 96 of the recessed cavity 36. In some constructions, the raceway 100 is constructed as a complete one-piece molded plastic component. For example, the raceway 100 can be an integral thermoplastic polyolefin (TPO) molded part. In other constructions, the raceway 100 may be any other suitable plastic, sheet metal, or cast material.

Figure 6A:
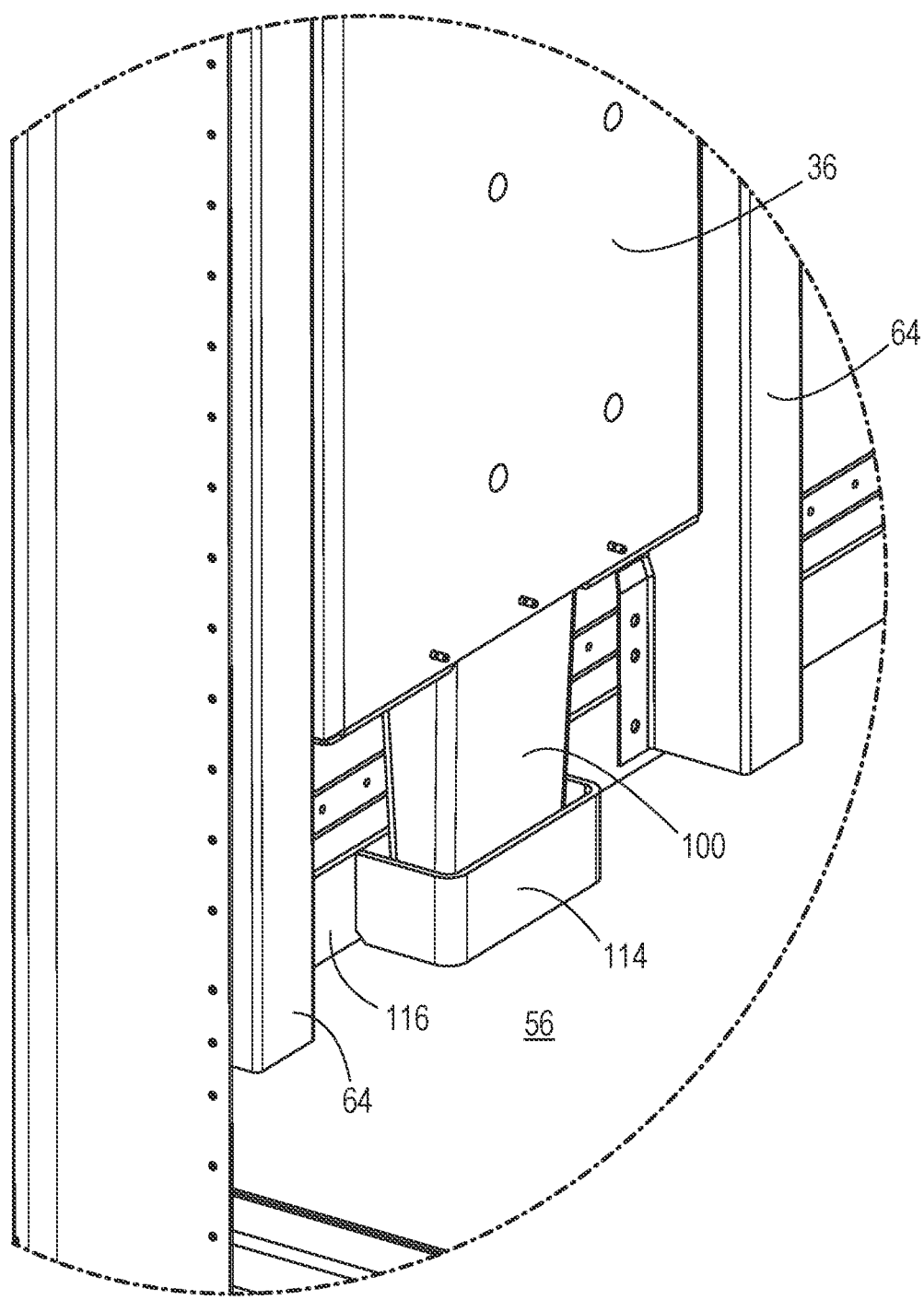
FIG. 6A is a detail view of a portion of the front wall and the coupler shown in FIG. 6.
Figure 7:
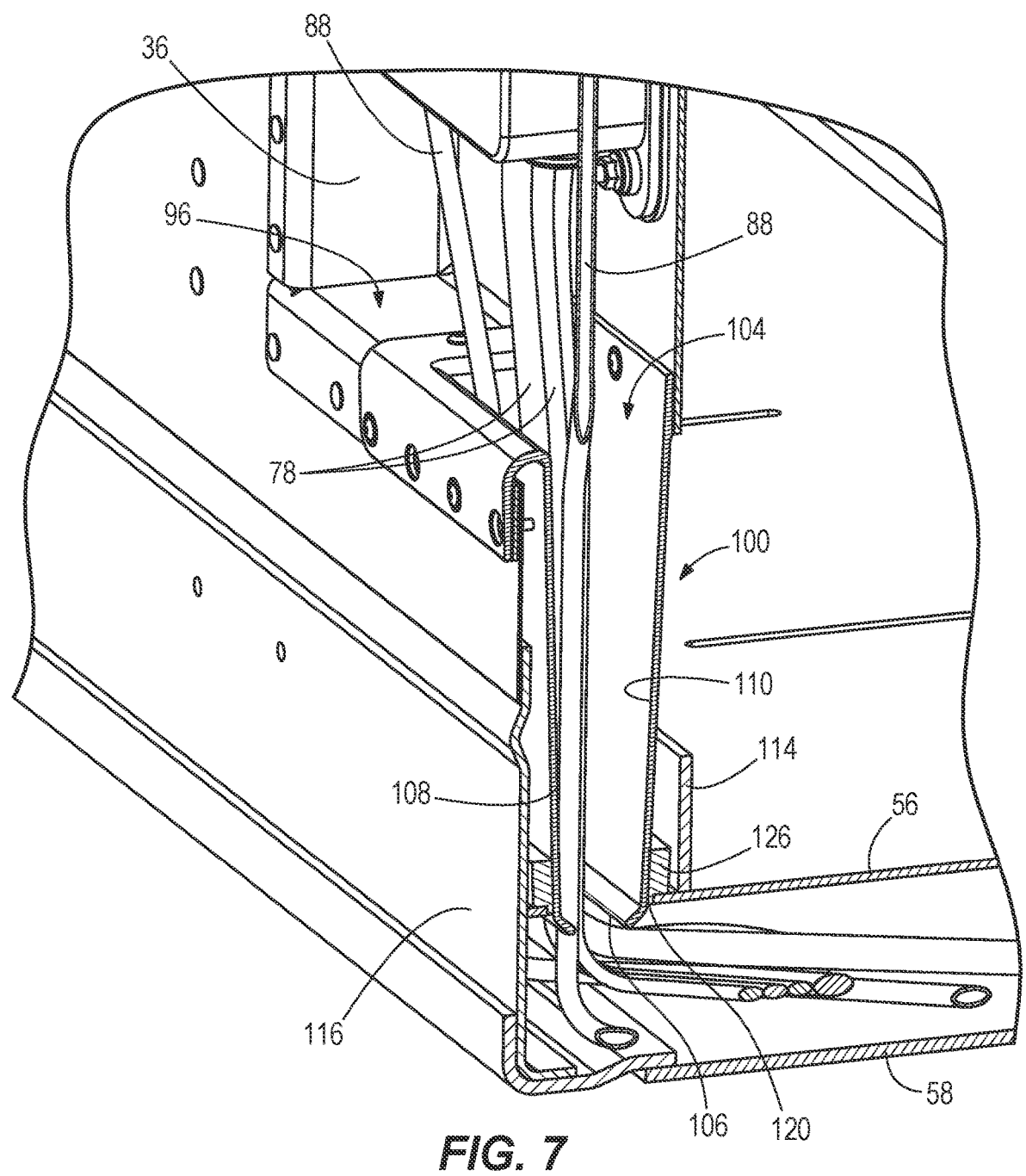
FIG. 7 is a cross-section view of the front wall of the trailer, taken along line 7-7 of FIG. 5.
Figure 9:
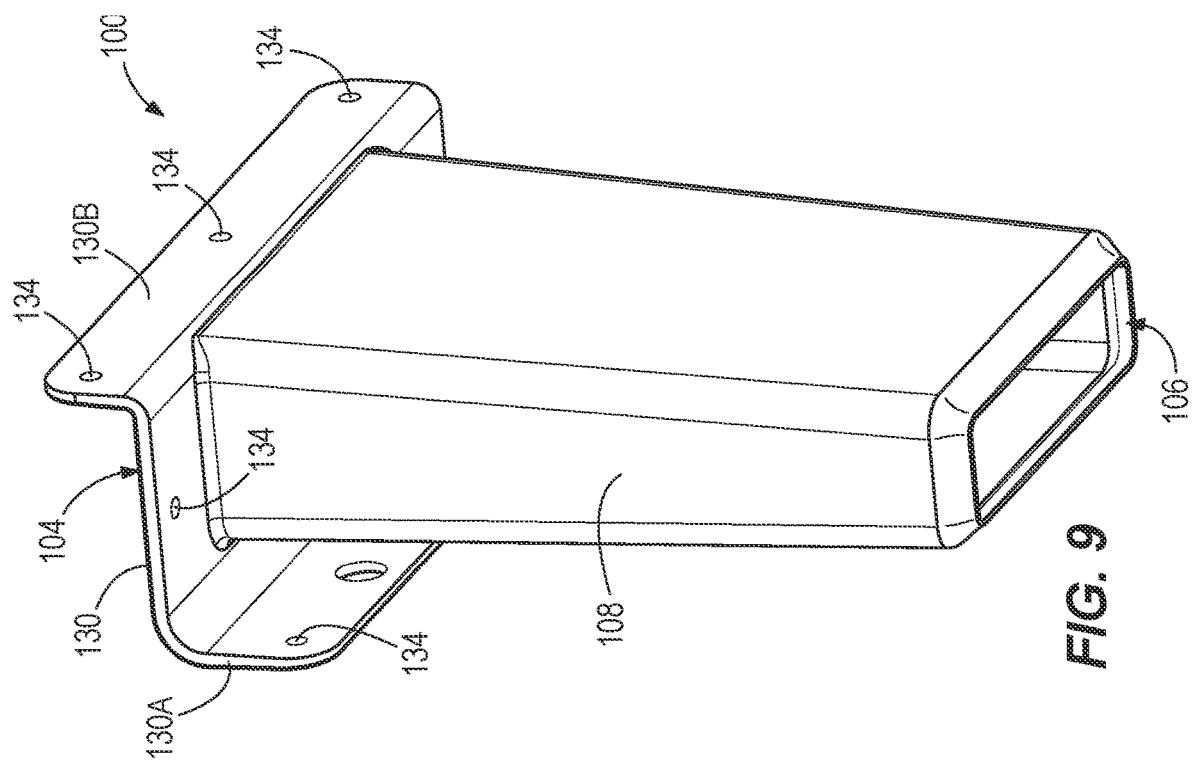
FIG. 9 is a bottom perspective view of the raceway shown in FIGS. 6-7.
Figure 8:
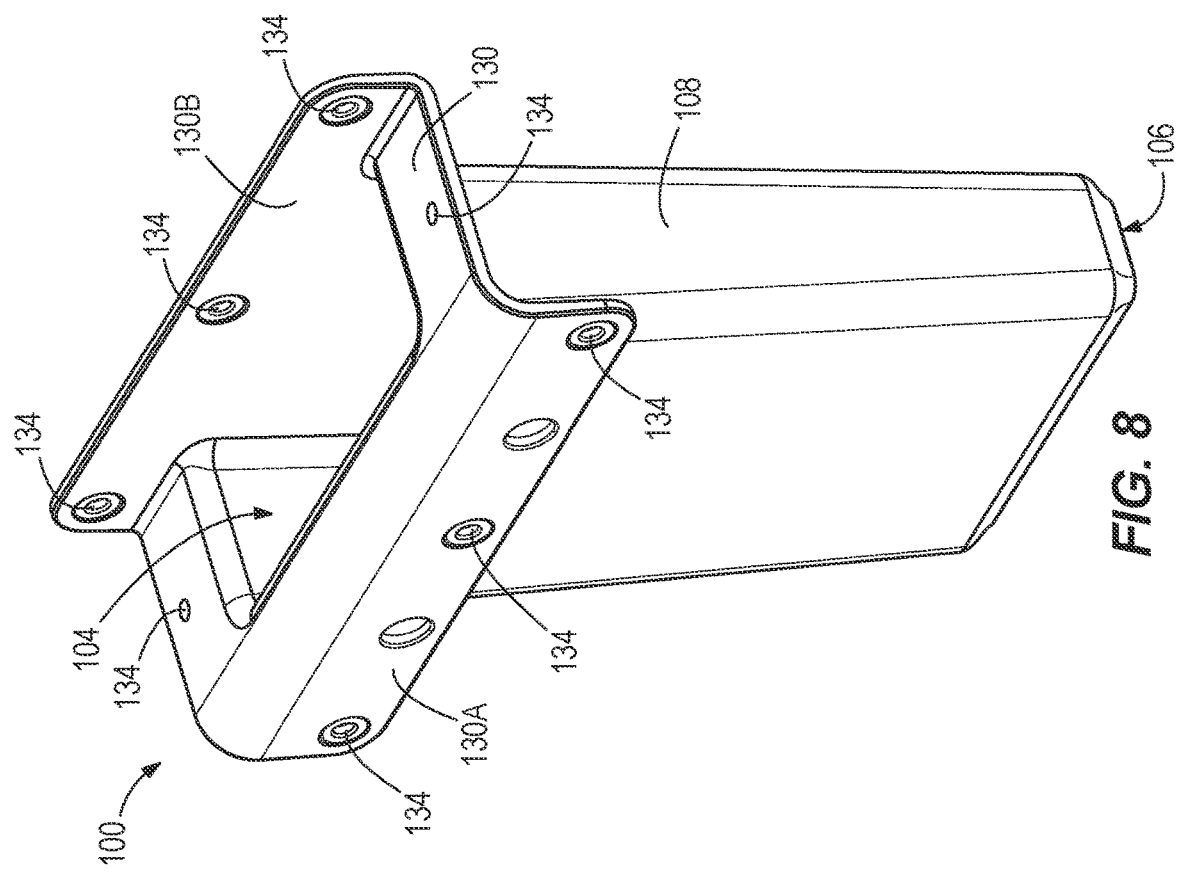
FIG. 8 is a top perspective view of the raceway shown in FIGS. 6-7.

With reference to FIGS. 6A and 7, a vertical wall or dam 114 is provided around the raceway lower end 106, the dam 114 extending upward from a top side of the upper coupler plate 56. The dam 114 can be constructed as a C-shaped member (e.g., sheet metal) sealed to the upper coupler plate around all three sides. Additionally, the dam 114 can be sealed to a vertical wall 116 situated at a front end of the coupler 54, just in front of the raceway 100. The vertical wall 116 can be a sheet metal bottom rail which is exposed on its other side at the front exterior side of the trailer 24. In some constructions, the dam 114 can be seam welded continuously along two vertical edges along the forward vertical wall 116 and three horizontal edges along the upper coupler plate 56. Thus, the dam 114, in combination with the forward vertical wall 116, encircles the lower end 106 of the raceway 100 where it interfaces with an opening 120 in the upper coupler plate 56. The dam 114 may rise vertically 25 mm or more (e.g., at least 40 mm or at least 50 mm) above the upper coupler plate 56. The dam 114 can inhibit water intrusion from the underside of the trailer 24 reaching the interior of the trailer 24 at the top side of the upper coupler plate 56, as a back-up or failsafe to sealing the raceway lower end 106. The lower coupler plate 58 can have openings therein (FIG. 4), potentially exposing the raceway lower end 106 to water spray during transport on wet roads. Although the top side of the upper coupler plate 56 is not directly exposed to the cargo area 46, it supports floor panels (not shown) which constitute the bottom of the cargo area 46 and should be kept dry.

As best shown in FIG. 7, the raceway lower end 106 is sealed to the opening 120 in the upper coupler plate 56. The seal can be established in a variety of ways, including application of a flowable seal medium (e.g., caulk), or a discrete seal member forming a gasket 126 as shown. The gasket 126 can be constructed of closed-cell foam tape in some constructions. The gasket 126 can be bonded to the raceway body wall 108 at the raceway lower end 106 and assembled with compression against the opening 120 in the upper coupler plate 56. Other arrangements for the gasket 126 or caulking can alternately be utilized. In some constructions, the raceway 100 can be formed with a transverse sealing flange at or adjacent the lower end 106 to facilitate sealing with the top side of the upper coupler plate 56.

At the raceway upper end 104, the raceway 100 includes an integral sealing flange 130 for interfacing with the box forming the recessed cavity 36 and preventing water intrusion to the trailer 24 around the raceway 100. In some constructions, the raceway upper end 104 is provided with a simple transverse sealing flange (e.g., transverse to the length of the raceway body wall 108). However, as shown, the sealing flange 130 has a contoured or multi-plane construction. A portion of the sealing flange 130 extends out transverse to the raceway body wall 108 to be oriented in a horizontal plane, on a top side of the bottom wall 96 of the recessed cavity 36. The sealing flange 130 further includes a forward extension 130A configured to wrap over the trailer front wall 40, and a rearward extension 130B configured to wrap up along the back recessed wall of the recessed cavity 36. A plurality of fastener apertures 134 are provided in the sealing flange 130 of the illustrated construction. The fastener apertures 134 can be configured to receive mechanical fasteners such as rivets as shown in FIGS. 5 and 7 for securing the raceway 100 to the trailer front wall 40 at the recessed cavity 36. The fastener apertures 134 and corresponding fasteners can be provided through the transverse portion of the sealing flange 130 and also the forward and rearward extensions 130A, 130B. In other constructions, the fastener apertures 134 can be provided in an array of more or fewer and/or an alternate arrangement around the sealing flange 130. In addition to or in lieu of mechanical fastening, the sealing flange 130 can be welded or bonded into place.

Figure 10:
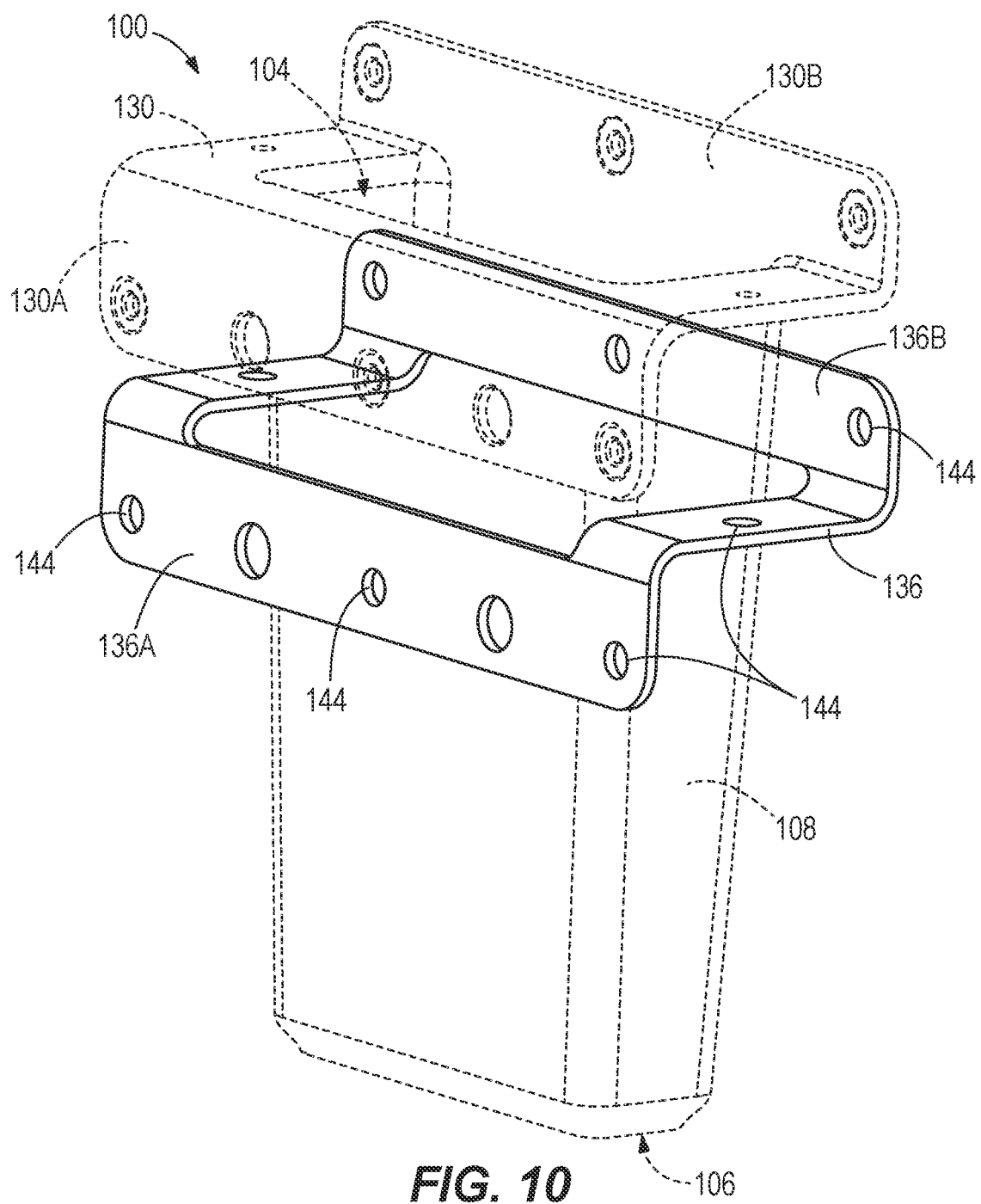
FIG. 10 is a perspective view illustrating a gasket exploded from an upper end flange of the raceway.

As shown in FIG. 10, and to a lesser degree in FIG. 7, a discrete seal member forming a gasket 136 is provided between the recessed cavity 36 and the sealing flange 130 to prevent the intrusion of water into the front wall 40 around the raceway 100. The gasket 136 can be constructed of closed-cell foam tape in some constructions. In other constructions, the sealing flange 130 can be sealed into the recessed cavity 36 by application of a flowable seal medium (e.g., caulk). The gasket 136 can have a shape that follows the contour established by the sealing flange 130, which as shown can include transverse portions in addition to forward and rearward vertical extensions 136A, 136B. The gasket 136 can be provided with fastener apertures 144 configured to match up with the fastener apertures 134 in the sealing flange 130 of the raceway 100.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A cargo trailer comprising:
a plurality of walls defining a cargo area, the plurality of walls including a front wall configured to face a rear of a tractor when the cargo trailer is coupled to the tractor;
a cavity recessed into a forward side of the front wall;
a plurality of utility line connectors positioned at least partially within the recessed cavity for establishing connections between at least one utility source of the tractor and at least one utility component of the cargo trailer, wherein the plurality of utility line connectors are spaced vertically above a bottom wall of the recessed cavity; and
a raceway having an upper end situated on the bottom wall and a lower end situated at a height below the cargo area,
wherein the raceway defines an interior tunnel configured for receiving a plurality of utility lines connected to the plurality of utility line connectors, the interior tunnel extending through an interior portion of the cargo trailer and being sealed from the cargo area.

2. The cargo trailer of claim 1, wherein the plurality of utility line connectors include air and electrical connectors.

3. The cargo trailer of claim 1, wherein the plurality of utility line connectors include first and second gladhand connectors coupled to brakes of the cargo trailer.

4. The cargo trailer of claim 1, wherein the plurality of utility line connectors includes a multi-pin electrical connector coupled to a plurality of lamps of the cargo trailer.

5. The cargo trailer of claim 1, wherein the raceway includes a sealing flange sealed to the bottom wall of the recessed cavity.

6. The cargo trailer of claim 5, wherein the sealing flange is sealed to the bottom wall with a foam gasket.

7. The cargo trailer of claim 1, wherein the raceway is entirely closed along a length extending between the upper and lower ends, both of which are open ends.

8. The cargo trailer of claim 1, wherein the raceway is of an integral molded plastic construction.

9. The cargo trailer of claim 1, further comprising a coupler positioned at an underside of the cargo trailer adjacent the front wall, the coupler including an upper coupler plate,
a lower coupler plate spaced below the upper coupler plate, and
a kingpin projecting downwardly from the lower coupler plate and configured for coupling with a tractor,
wherein the lower end of the raceway is sealed to an opening in the upper coupler plate.

10. The cargo trailer of claim 9, wherein the lower end of the raceway is sealed to the opening in the upper coupler plate with a foam gasket.

11. The cargo trailer of claim 9, wherein the opening in the upper coupler plate is surrounded by a dam sealed to and extending upwardly from the upper coupler plate.

12. A cargo trailer comprising:
a rear end configured for loading and unloading cargo;
a coupler including a kingpin adjacent a front end of the cargo trailer and configured for facilitating attachment with a tractor;
a cargo area defined between the front and rear ends;
a cavity recessed into a forward-facing side of a front wall of the cargo trailer at the front end thereof; and
a raceway coupled to the cavity, wherein a plurality of utility line connectors are positioned within the recessed cavity and configured for connection with a plurality of external utility lines, wherein the raceway defines a sealed tunnel extending between the recessed cavity and the coupler, the sealed tunnel jointly accommodating a plurality of trailer utility lines that are connected with the plurality of utility line connectors in the recessed cavity.

13. The cargo trailer of claim 12, wherein the raceway has an upper end open to the recessed cavity and sealed to a bottom wall thereof.

14. The cargo trailer of claim 13, wherein the raceway upper end includes a sealing flange fastened to the bottom wall of the recessed cavity with a gasket therebetween.

15. The cargo trailer of claim 12, wherein the raceway has a lower end sealed to an upper plate of the coupler, the lower end being exposed to an internal coupler cavity between the upper plate and a lower plate of the coupler.

16. The cargo trailer of claim 15, wherein the raceway lower end is sealed with a gasket into an opening in the upper plate of the coupler.

17. The cargo trailer of claim 16, wherein the opening in the upper coupler plate is surrounded by a dam sealed to and extending upwardly from the upper coupler plate.

18. The cargo trailer of claim 12, wherein the raceway is of an integral molded plastic construction.

19. The cargo trailer of claim 12, wherein the plurality of utility line connectors include air and electrical connectors.

20. The cargo trailer of claim 12, wherein the plurality of utility line connectors include first and second gladhand connectors coupled to brakes of the cargo trailer.

21. The cargo trailer of claim 12, wherein the plurality of utility line connectors includes a multi-pin electrical connector coupled to a plurality of lamps of the cargo trailer.

* * * * *